(12) United States Patent
Washiro

(10) Patent No.: US 8,008,985 B2  
(45) Date of Patent: Aug. 30, 2011

(54) HIGH-FREQUENCY ELECTRIC FIELD COUPLER, COMMUNICATION SYSTEM, AND COMMUNICATION APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 12/240,447

(22) Filed: Sep. 29, 2008

(65) Prior Publication Data

US 2009/0096556 A1  Apr. 16, 2009

(30) Foreign Application Priority Data

Oct. 15, 2007  (JP) ................ P2007-268018

(51) Int. Cl.
*H01P 3/10* (2006.01)
*H03H 2/00* (2006.01)

(52) U.S. Cl. .......... 333/24 R; 333/236

(58) Field of Classification Search .......... 333/24 R, 333/202, 204, 236, 246; 343/749, 752, 829, 343/850, 852

See application file for complete search history.

(56) References Cited

U.S. PATENT DOCUMENTS

| | | | |
|---|---|---|---|
| 6,903,688 B2 * | 6/2005 | Edvardsson | 343/700 MS |
| 7,760,150 B2 * | 7/2010 | Sato | 343/724 |
| 7,804,457 B2 * | 9/2010 | Oshiyama et al. | 343/749 |
| 7,821,361 B2 * | 10/2010 | Hsu | 333/204 |
| 2009/0243759 A1 * | 10/2009 | Chen et al. | 333/204 |
| 2010/0019871 A1 * | 1/2010 | Washiro | 333/246 |

FOREIGN PATENT DOCUMENTS

| | | |
|---|---|---|
| JP | 2-213233 | 8/1990 |
| JP | 6-260815 | 9/1994 |
| JP | 9-69718 | 3/1997 |
| JP | 10-56315 | 2/1998 |
| JP | 10-242742 | 9/1998 |
| JP | 11-136025 | 5/1999 |
| JP | 2002-314330 | 10/2002 |
| JP | 2004-254109 | 9/2004 |
| JP | 2004-336250 | 11/2004 |
| JP | 2006-60283 | 3/2006 |
| JP | 2006-324966 | 11/2006 |
| WO | WO 2007/032049 A1 | 3/2007 |

* cited by examiner

*Primary Examiner* — Dean O Takaoka

(74) *Attorney, Agent, or Firm* — Finnegan, Henderson, Farabow, Garrett & Dunner, L.L.P.

(57) ABSTRACT

A high-frequency electric field coupler is provided for use in a contactless communication system propagating high frequency signals in a wide band utilizing electric field coupling. The coupler includes a coupling electrode and a resonance unit operating to increase the amplitude of an electrical charge accumulated at the coupling electrode at a predetermined resonance frequency. The coupling electrode is a linear conductor in the form of a coil.

10 Claims, 6 Drawing Sheets

HIGH-FREQUENCY ELECTRIC FIELD COUPLER, COMMUNICATION SYSTEM, AND COMMUNICATION APPARATUS

CROSS REFERENCES TO RELATED APPLICATIONS

The present invention contains subject matter related to Japanese Patent Application JP 2007-268018 filed in Japanese Patent Office on Oct. 15, 2007, the entire contents of which being incorporated herein by reference.

BACKGROUND OF THE INVENTION

1. Field of the Invention

The present invention relates to a high-frequency electric field coupler used in a contactless communication system propagating high-frequency signals in a wide band utilizing electric field coupling and relates to a communication system and communication apparatus utilizing the coupler. More particularly, the invention relates to a high-frequency electric field coupler with excellent characteristics having a coupling electrode and a resonance unit operating to increase the amplitude of electrical charge accumulated at the coupling electrode at a predetermined resonance frequency, and the invention relates to a communication system and a communication apparatus utilizing the coupler.

2. Description of the Related Art

Most radio communication systems according to the related art such as radio LANs (local area networks) which are typically in compliance with IEEE802.11 and Bluetooth (a registered trademark) communication systems are electrical wave communication systems which propagate a signal utilizing a radiation electric field generated when a current is passed through an aerial (antenna). A communication system of this type has a problem in that a transmitting end of the system can be a source of an electric wave disturbing an adjacent communication system because an electric wave may be radiated regardless of whether there is a party to communicate.

Methods of radio communication other than electric wave communication as described above include contactless communication methods which utilize an electrostatic field or induction field. For example, existing contactless communication systems primarily used for RFID (radio frequency identification) utilize the electric field coupling method or magnetic field coupling method. An electrostatic field undergoes an abrupt attenuation inversely proportionate to the third power of the distance of the same from the source, and an induction field undergoes an abrupt attenuation inversely proportionate to the second power of the distance of the same from the source. Therefore, such a field allows radio communication to be performed at such an extremely low power that the intensity of an electrical field (the intensity of an electric wave) at a distance of 3 meters from a radio facility equals or falls below a predetermined level. No license is required to run a radio station in such a case. In the case of a contactless communication system of this type, no coupling relationship occurs and no electric field is radiated when the system has no party to communicate in the neighborhood of the same. Therefore, the system will not disturb any other communication system. Even when there is an incoming electric wave from a remote source, an electric field coupler of the system will not receive the electric wave. Thus, the system will not be interfered by any other communication system.

There are proposals on RFID tag systems including a set of communication aiding bodies which are disposed such that an RFID tag is located between a plurality of communication aiding bodies. RFID tags attached to a plurality of commodities are disposed such that they are sandwiched by communication aiding bodies. Thus, information can be reliably read from the RFID tags or written in the tags even when the tags overlap each other (See JP-A-2006-60283 (Patent Document 1) for example).

SUMMARY OF THE INVENTION

An RFID system utilizing an electrostatic field or induction field is not suitable for transmission of a large volume of data because it uses low frequency signals which result in a low communication speed. In the case of a communication system utilizing an induction field generated by an antenna coil, communication is disabled when there is a metal plate behind the coil. Problems therefore arise in packaging the system, including a need for disposing the coil on a plane having a large surface area. The system also suffers from significant losses in the transmission path and consequently has low efficiency, of signal transmission.

Under the circumstance, the inventors thought that a contactless communication system capable of high speed data transmission could be provided by allowing high frequency signals in a wide band to be propagated using electric field coupling. Obviously, such a contactless communication system having a higher speed requires no license when it is used as a radio station because the system utilizes an extremely weak electric field, and secrecy can be also sufficiently guaranteed.

In a contactless communication system utilizing electric field coupling, one capacitor is formed by a coupling electrode at a transmitting end and a coupling electrode at a receiving end, the electrodes being provided in the form of sheets facing each other. Since the system as a while operates like a band-pass filter, a high-frequency signal can be efficiently transmitted between the two high-frequency electric field couplers.

It is known that the capacity of a capacitor is proportionate to the surface area of electrodes provided to face each other. A problem therefore arises in that it is difficult to make coupling electrodes compact when consideration is paid to a need for generating an effective electric field which allows communication to be established between couplers of a transmitter and a receiver. It is assumed here that primary applications of a contactless communication system are small information terminals such as cellular phones and digital still cameras, and the size of coupling electrodes becomes a bottleneck in designing such apparatus.

It is desirable to provide a high-frequency electric field coupler to be used in a contactless communication system propagating high-frequency signals in a wide band utilizing electric field coupling and to provide a communication system and a communication apparatus utilizing such a coupler.

It is also desirable to provide an excellent high-frequency electric field coupler with high characteristics having a coupling electrode and a resonance unit operating to increase the amplitude of electrical charge accumulated at the coupling electrode at a predetermined resonance frequency and to provide a communication system and a communication apparatus utilizing such a coupler.

It is also desirable to provide an excellent high-frequency electric field coupler which can be made compact while maintaining sufficient characteristics of coupling with another coupler of a party to communicate at a predetermined resonance frequency. It is also desirable to provide a communication system and a communication apparatus utilizing such a coupler.

The invention was made taking the above-described problem into consideration. According to an embodiment of the invention, there is provided a high-frequency electric field coupler used in a contactless communication system propagating high-frequency signals in a wide band utilizing electric field coupling, characterized in that it includes a coupling electrode and a resonance unit operating to increase the amplitude of electrical charge accumulated at the coupling electrode at a predetermined resonance frequency and in that the coupling electrode is a coiled linear conductor.

The high-frequency electric field coupler according the embodiment of the invention can be made very small because the coupling electrode is a linear conductor which is bent in the form of a coil. Just as done in high-frequency electric field couplers according to the related art, the coupling electrode is connected to the resonance unit which operates to increase the amplitude of electrical charge accumulated at the coupling electrode at a predetermined resonance frequency. Thus, the high-frequency electric field coupler can be provided with high characteristics.

The surface of the linear conductor may be coated with an insulation layer to prevent shorting from occurring in the middle of the coil. Since the coil has low mechanical strength without a core, the linear conductor may be wound around a core bar. Alternatively, after the conductor is wound in the form of a coil, it may be fixed using a resin to improve the strength of the same.

The resonance unit may be provided in the form of a lumped constant circuit or a distributed constant circuit, i.e., a stub. When a stub is used, the stub may be an open stub whose terminating end is open or a short stub whose terminating end is shorted to ground. In either of the configurations, circuit constants or stub length is set such that the resonance unit will have the function of operating to increase the amplitude of electrical charge accumulated at the coupling electrode at a predetermined resonance frequency.

For example, the high-frequency electric field coupler is formed by shorting an end of the coupling electrode, which is a coiled conductor, to ground and connecting the resonance unit, which is a lumped constant circuit such as a capacitor element, in parallel with the coupling electrode.

Alternatively, the resonance unit may be a short stub having a length that is one-half of a used wavelength $\lambda$. The high-frequency electric filed coupler may be formed by connecting the coupling electrode, which is a coiled conductor, to a position of the short stub substantially at the center thereof and shorting an end of the coupling electrode to the ground.

Alternatively, the resonance unit may include a first resonance stub and a second resonance section which are substantially equal to each other in length. The resonant unit is an open stub having a terminating end in an open state, and both ends of the coupling electrode in the form of a coiled conductor are connected to the first and second resonance stubs, respectively to form a high-frequency electric field coupler. In this case, the combined length of the coiled coupling electrode and the first and second resonance stubs is preferably substantially equivalent to a full wavelength, i.e. the entirely of the used wavelength $\lambda$.

The coupling electrode in the form of a coiled linear conductor may be disposed to extend straightly and may be connected to the resonance unit in such a state. As a modification to this, the electrode may be bent in the form of a ring. In the latter case, since the coupling electrode can be accommodated in a smaller space because of the ring-like shape, a further reduction can be achieved in the size of the high-frequency electric field coupler. While the straight coil generates an electric field uniformly oriented in the radial direction of the coil, the ring-shaped coil provides stable coupling strength because it is less orientation-dependent. It is considered that a size reduction and an improvement in coupling strength can be more significantly achieved by bending the coil serving as a coupling electrode in a helical shape instead of a ring-like shape.

When a coupling electrode in the form of a coiled conductor bent in a ring-like shape is used, the winding direction of the coil may be reversed in the middle of the ring. The result is equivalent to forming a coupling electrode in the form of a coil by combining a plurality of coils wound in opposite directions. A magnetic current generated in the coupling electrode can be cancelled to reduce radiation of unnecessary electric waves by reversing the winding direction of the coil.

According to the embodiment of the invention, an excellent high-frequency electric field coupler to be used in a contactless communication system for propagating high-frequency signals in a wide band utilizing electric field coupling can be provided along with a communication system and a communication apparatus utilizing the same.

According to the embodiment of the invention, it is possible to provide an excellent high-frequency electric field coupler with high characteristics having a coupling electrode and a resonance unit operating to increase the amplitude of electrical charge accumulated at the coupling electrode at a predetermined resonance frequency along with a communication system and a communication apparatus utilizing the same.

According to the embodiment of the invention, an excellent high-frequency electric field coupler of small size can be provided while maintaining sufficient characteristics of coupling of the same with a coupler of a party to communicate at a predetermined resonance frequency. A communication system and a communication apparatus utilizing such a coupler can be also provided. According to the embodiment of the invention, a coupling electrode may be formed using a linear conductor and may be bent in the form of a coil, which allows a significant size reduction. A resonance unit may be connected to the coupling electrode to increase the amplitude of electrical charge accumulated at the coupling electrode at a predetermined resonance frequency just as done in high-frequency electric field couplers according to the related art. Thus, a high-frequency electric filed coupler having high characteristics can be provided.

Other objects, features and advantages of the invention will become apparent from the following detailed description of the invention based on the embodiment and the accompanying drawings.

DESCRIPTION OF THE PREFERRED EMBODIMENTS

Figure 1:
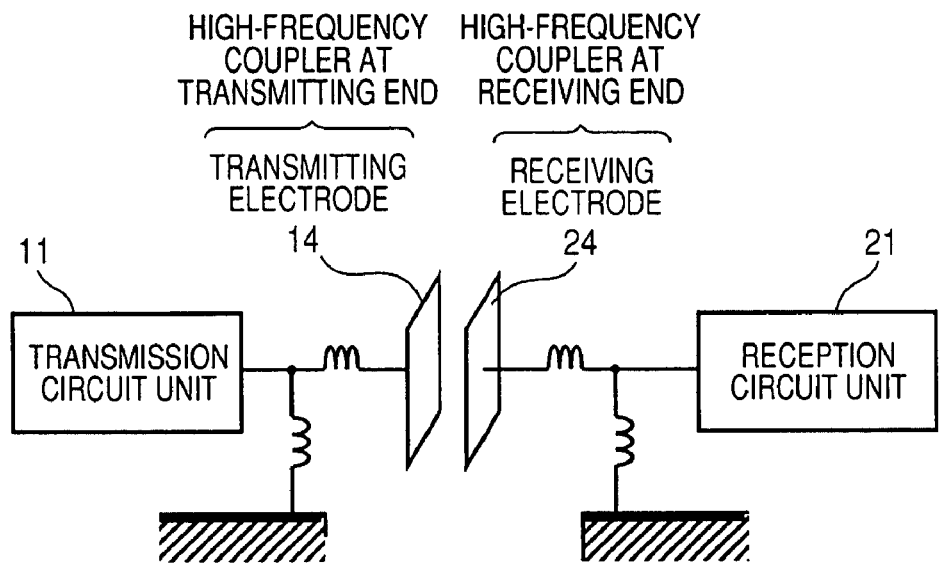
FIG. 1 shows an example of a configuration of a contactless communication system based on electric field coupling using an electrostatic field or induction field.

An embodiment of the invention will now be described in detail with reference to the drawings.

The invention relates to a communication system for transmitting data between information apparatus utilizing an electrostatic field or induction field. When a communication method based on an electrostatic field or induction field is used, no coupling relationship exists and no electric wave is radiated when a communication system of interest has no party to communicate in the vicinity of the same. Therefore, the communication method will not result in any disturbance to other communication systems unlike an electrical wave communication method utilizing a radiation electrical field. Even when there is an incoming electric wave from a remote source, the electric wave is not received by a coupler of the communication system. Thus, the system is not interfered by other communication systems.

In the case of electrical wave communication using an antenna according to the related art, the field intensity of a radiation electric field is inversely proportionate to the distance of the field from the source. The field intensity of an induction field attenuates inverse-proportionately to the second power of the distance of the field from the source, and an electrostatic field attenuates inverse-proportionately to the third power of the distance of the field from the source. According to a communication method based on electric field coupling, it is possible to form a radio system having extremely low power which constitutes merely a noise level for other radio systems existing in the neighborhood. There is no need for obtaining a license for such a radio station.

An electrostatic field fluctuating with time is sometimes called a quasi-electrostatic field, and such an electric field will be also referred to as "an electrostatic field" in this specification.

Communication utilizing an electrostatic field or induction field according to the related art is not suitable for transmission of a great amount of data because low-frequency signals are used in such communication. On the contrary, a communication system according to an embodiment of the invention can transmit a great amount of data because the system transmits high-frequency signals utilizing electric field coupling. Specifically, high volume data communication can be performed through extremely weak radio transmission by applying a communication method using high frequencies and a wide band such as UWB (ultra wide band) communication to electric field coupling.

The inventors consider a data transmission system utilizing low-band UWB to be one of radio communication techniques which are advantageous when implemented in mobile apparatus. For example, such a technique allows high speed data transmission in a short range such as that achieved with an ultra high speed short range DAN (device area network) including a storage device. A UWB communication system utilizing an electrostatic field or induction field is capable of data communication using an extremely weak electric field. In addition, such a system can transfer a great amount of data such as dynamic images or music data of one CD at a high speed in a short time (for example, see the specifications of Japanese Patent Application Nos. 2006-245614, 2006-314458, and 2007-159629 which have already been assigned to the applicant).

FIG. 1 schematically shows a configuration of a contactless communication system utilizing an electrostatic field or induction field. The illustrated communication system includes a transmitter 10 which transmits data and a receiver 20 which receives data. When high-frequency electric field couplers of the transmitter and the receiver are disposed so as to face each other as shown in the figure, two electrodes operate as one capacitor, and they operate like a band-pass filer as a whole. Therefore, a high-frequency signal can be efficiently transmitted between the two high-frequency electric field couplers.

Electrodes 14 and 24 for transmission and reception provided at the transmitter 10 and receiver 20, respectively, are disposed opposite to each other at an interval of, for example, about 3 cm to allow electric field coupling between them. When there is a request for transmission from a host application, a transmission circuit unit 11 of the transmitter generates a high-frequency transmission signal such as a UWB signal based on transmission data, and the signal is propagated from the transmitting electrode 14 to the receiving electrode 24. The reception circuit unit 21 of the receiver 20 demodulates and decodes the received high-frequency signal and passes the data thus reproduced to the host application.

Figure 2:
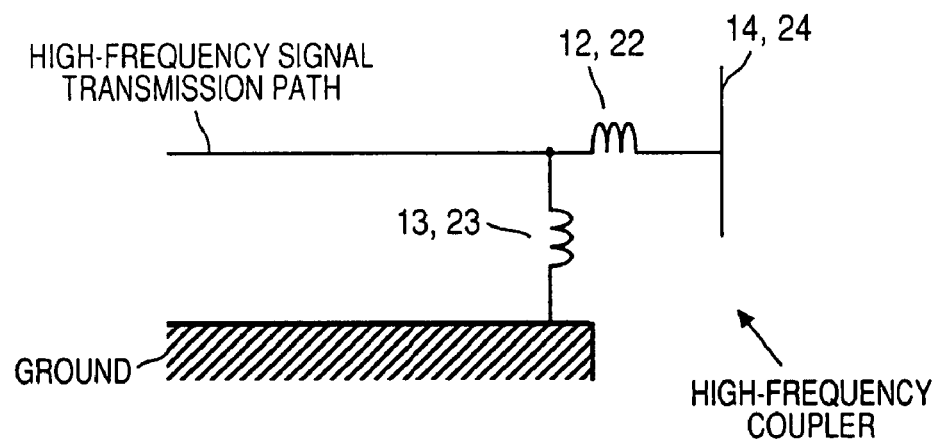
FIG. 2 shows an equivalent circuit of a high-frequency electric field coupler.
Figure 3:
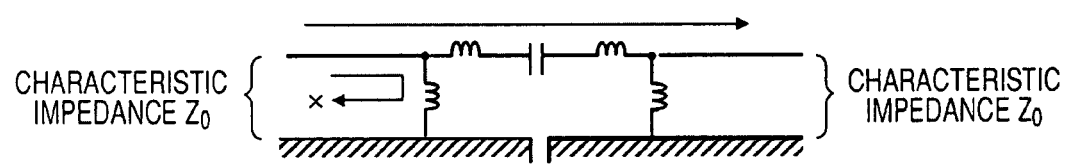
FIG. 3 shows an equivalent circuit of the contactless communication system shown in FIG. 1.

In the UWB communication system utilizing an electrostatic field, when there is impedance mismatch at the coupling section between the transmitting electrode 14 and the receiving electrode 24, a signal will undergo reflection and suffer from a propagation loss. In order to cope with this problem, as shown in the equivalent circuit in FIG. 2, the transmitter 10 and the receiver 20 are provided with respective high-frequency electric field couplers which are formed by connecting respective elements, i.e., the sheet-like electrodes 14 and 24, series inductors 12 and 22, and parallel inductors 13 and 23 to a high-frequency signal transmission path. When such high-frequency electric field couplers are disposed to face each other as shown in the equivalent circuit in FIG. 3, the two electrodes operates as one capacitor, and they operate like a band-pass filter as a whole. Therefore, a high-frequency signal can be efficiently transmitted between the two high-frequency electric field couplers. The high-frequency signal transmission path may be a coaxial cable, a micro strip line, or a coplanar line.

Figure 4:
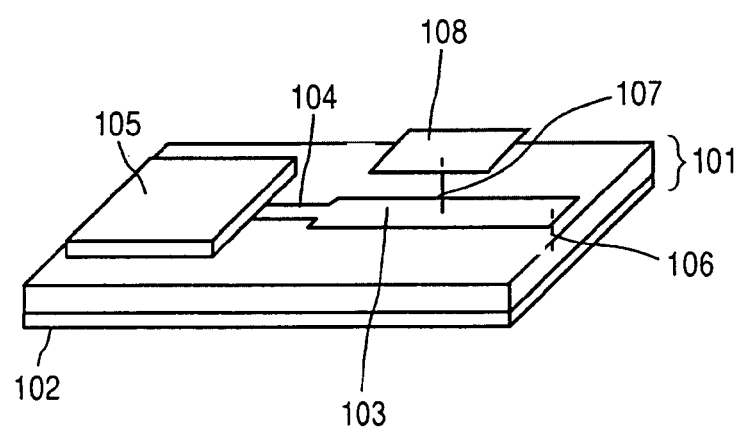
FIG. 4 shows an example of a configuration of a high-frequency electric field coupler mounted on a printed board.

FIG. 4 shows an example of a configuration of the high-frequency electric filed coupler mounted on a printed circuit board. In the illustrated example, a high-frequency electric field coupler is disposed on a printed circuit board 101 having a ground conductor 102 formed on a bottom surface thereof and a printed pattern on a top surface thereof. A conductor pattern or stub 103, which is a distributed constant circuit, is formed instead of parallel and series inductors, the stub serving as an impedance matching unit and a resonance unit of the high-frequency electric field coupler. The stub is connected to a transmission/reception circuit module 105 through a signal line pattern 104. An end of the stub 103 is connected or shorted to the ground 102 on the bottom surface via a through hole 106 extending through the printed circuit board 101, and the stub 103 is connected to a coupling electrode 108 through a metal line 107 substantially in the middle thereof.

The length of the stub 103 is approximately equivalent to one-half of the wavelength of a high frequency signal, and the signal line 104 and the stub 103 are formed as micro strip lines or coplanar lines on the printed circuit board 101. When the length of the stub 103 is equivalent to a half-wavelength and the stub is shorted at one end thereof, the voltage amplitude of a standing wave generated in the stub 103 is 0 at the end of the stub, and there is a maximum amplitude at the center of the stub or the position at a distance equivalent to a quarter-wavelength from the end of the stub 103. The coupling electrode 108 is connected through the metal line 107 to the center of the stub 103 where the voltage amplitude is at the maximum. Thus, a high-frequency electric field coupler having high propagation efficiency can be fabricated. Since an impedance matching unit is constituted by the stub 103 which is a distributed constant circuit formed by a conductor pattern on the printed circuit board 101, uniform characteristics can be achieved throughout a wide band.

In the contactless communication system utilizing an electrostatic field or induction field, the high-frequency electric field coupler achieves coupling using an electrostatic field or induction field which undergoes distance-dependent attenuation greater than that of a radiation electric field radiated from an antenna. Therefore, the system is preferably used as a coupling unit for short-range communication.

From the viewpoint of compactness, it is not preferable to form the coupling electrode of the high-frequency electric field coupler using a planar conductor as shown in FIG. 4.

A significant size reduction can be achieved by forming the coupling electrode using a linear conductor and by bending the linear conductor in the form of a coil. Just as done in the high-frequency electric field coupler shown in FIG. 4, a resonance unit is connected to the coupling electrode to increase the amplitude of electrical charge accumulated at the coupling electrode at a predetermined resonance frequency. Thus, a high-frequency electric field coupler having high characteristics can be provided.

When the coupling electrode is formed using a linear conductor, the coupling electrode and the resonance unit are provided on a printed circuit board, and the opposite surface of the board is covered with ground, just as done in the high-frequency electric field coupler shown in FIG. 4.

The coupling electrode formed using a linear conductor is a coiled conductor having an effective length which is about one-half of a used wavelength λ. Specifically, the length is determined such that there is a phase difference of about 180 degrees between input and output signals which are a high-frequency signal input from one end of the coiled conductor serving as the coupling electrode and a resultant signal output from another end of the conductor, respectively. When a high-frequency signal is input, a standing wave is generated in the coil.

The coil is prevented from shorting in the middle of the same by coating the surface of the linear conductor with an insulation layer. Since the coil has low mechanical strength without a core, the mechanical strength of the linear conductor may be improved by winding the conductor around a core bar or fixing the conductor with a resin after winding it in the form of a coil (neither approach is illustrated).

A resonance unit is connected to the coupling electrode in the form of a coil. The resonance unit may be provided in the form of a lumped constant circuit or a distributed constant circuit, i.e., a stub. When a stub is used, the stub may be an open stub whose terminating end is in an open state or a short stub whose terminating end is shorted to ground. In either of the configurations, circuit constants or stub length is set such that the resonance unit will have the function of operating to increase the amplitude of electrical charge accumulated at the coupling electrode at a predetermined resonance frequency.

Figure 5:
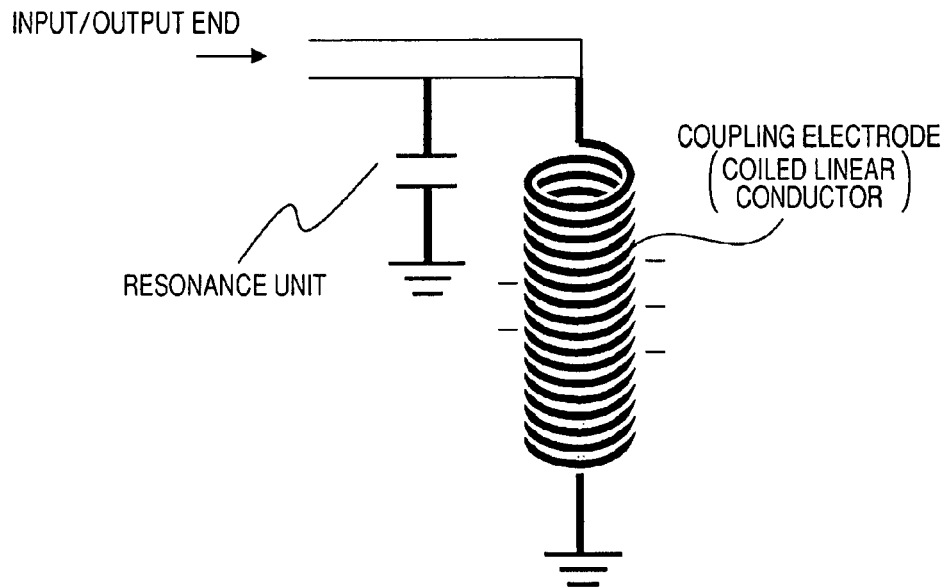
FIG. 5 shows a configuration of a high-frequency electric field coupler having a resonance unit that is a lumped constant circuit.

FIG. 5 shows a configuration of a high-frequency electric field coupler having a resonance unit which is a lumped constant circuit. An end of a coupling electrode in the form of a coil is shorted to ground. The resonance unit is a capacitor element serving as a lumped constant circuit, and the unit is connected in parallel with the coupling electrode.

Figure 6:
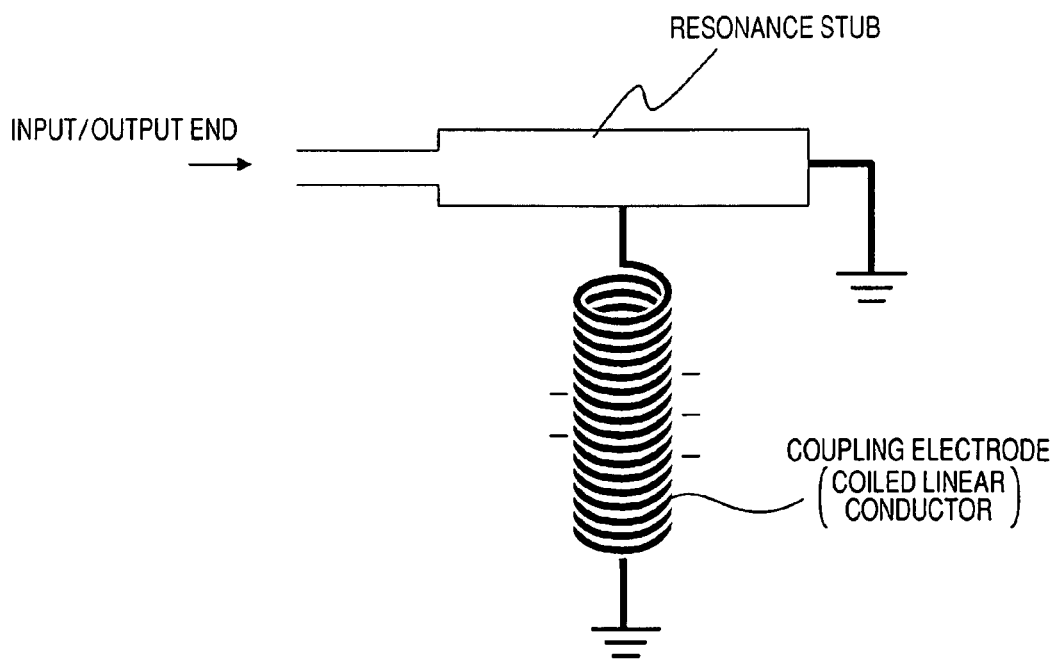
FIG. 6 shows an example of a configuration of a high-frequency electric field coupler having a resonance unit that is a half-wavelength stub.

FIG. 6 shows an example of a configuration of a high-frequency electric field coupler having a resonance unit which is a half-wavelength short stub. A coupling electrode in the form of a coil is connected to a position of the short stub substantially at the center thereof, and an end of the electrode is shorted to ground. The reason for connecting the coupling electrode to the substantially central position of the short stub is that a standing wave in the short stub with a length equivalent to a half-wavelength has a maximum amplitude in the vicinity of the central position.

Figure 7:
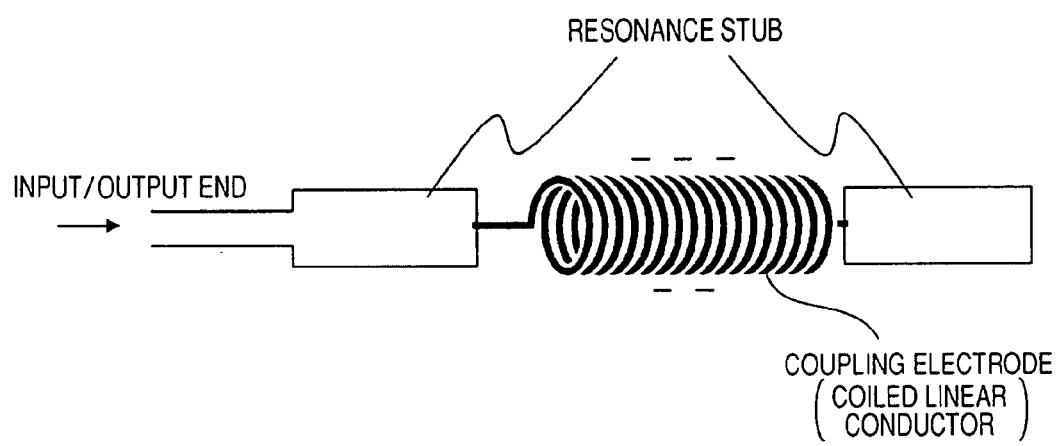
FIG. 7 shows an example of a configuration of a high-frequency electric field coupler having a resonance unit that is an open stub.

FIG. 7 shows an example of a configuration of a high-frequency electric field coupler having a resonance unit which is an open stub. In the illustrated example, the resonance unit is divided into first and second resonance stubs having substantially equal lengths, and both ends of a coupling electrode, which is a coiled conductor, are connected to the first and second stubs, respectively. In this case, the combined length of the coiled coupling electrode and the first and second resonance stubs is preferably substantially equivalent to a full wavelength or the entirety of a used wavelength λ.

Figure 8:
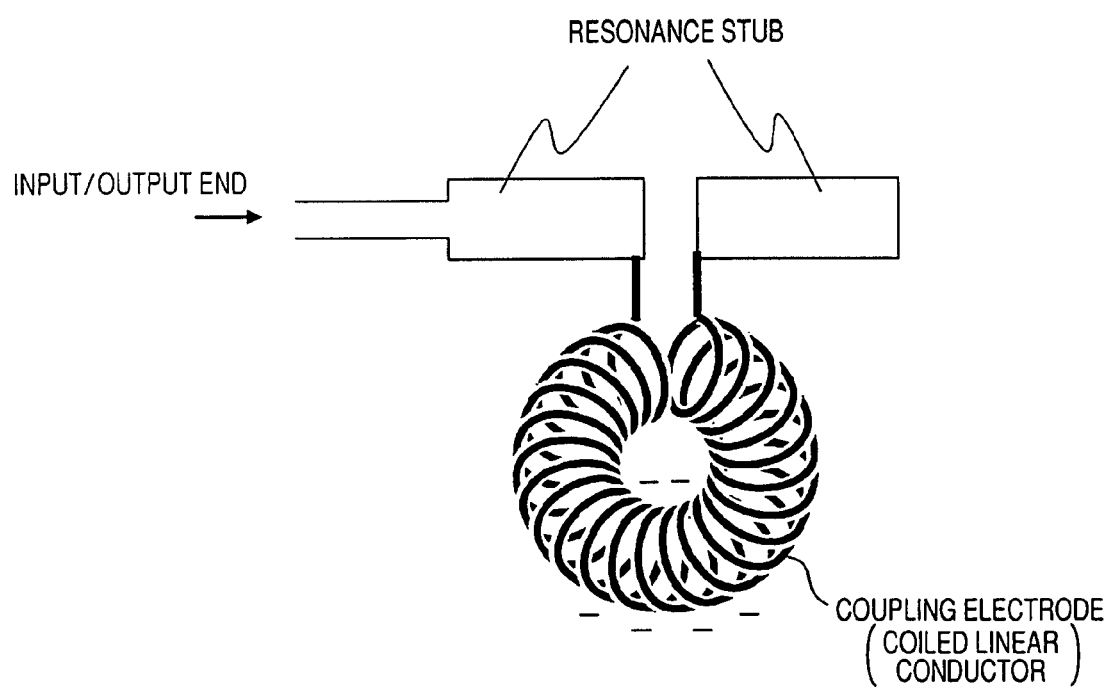
FIG. 8 shows another example of a configuration of a high-frequency electric field coupler having a resonance unit that is an open stub.

FIG. 8 shows another example of a configuration of a high-frequency electric field coupler having a resonance unit which is an open stub. In the illustrated example, the resonance unit is also divided into first and second resonance stubs substantially equal to each other in. In the example shown in FIG. 7, the coupling electrode in the form of a coiled linear conductor extends straightly, and both ends of the electrode are connected to the first and second resonance stubs, respectively. On the contrary, in the example shown in FIG. 8, the coupling electrode in the form of a coiled linear conductor is bent in the form of a ring, and both ends of the electrode are connected to the first and second resonance stubs, respectively. The combined length of the coiled coupling electrode and the first and second resonance stubs is preferably substantially equivalent to a full wavelength. In the latter case, the coupling electrode can be accommodated in a smaller space because it is in the form of a ring, and the high-frequency electric field coupler can therefore be provided in a smaller size. While the straight coil generates an electric field which is uniformly oriented in the radial direction of the coil, the ring-shaped coil provides stable coupling strength which is less orientation-dependent.

It is considered that such an effect is further improved by bending the coil serving as the coupling electrode in a helical shape (not shown) instead of a ring-like shape.

Figure 9:
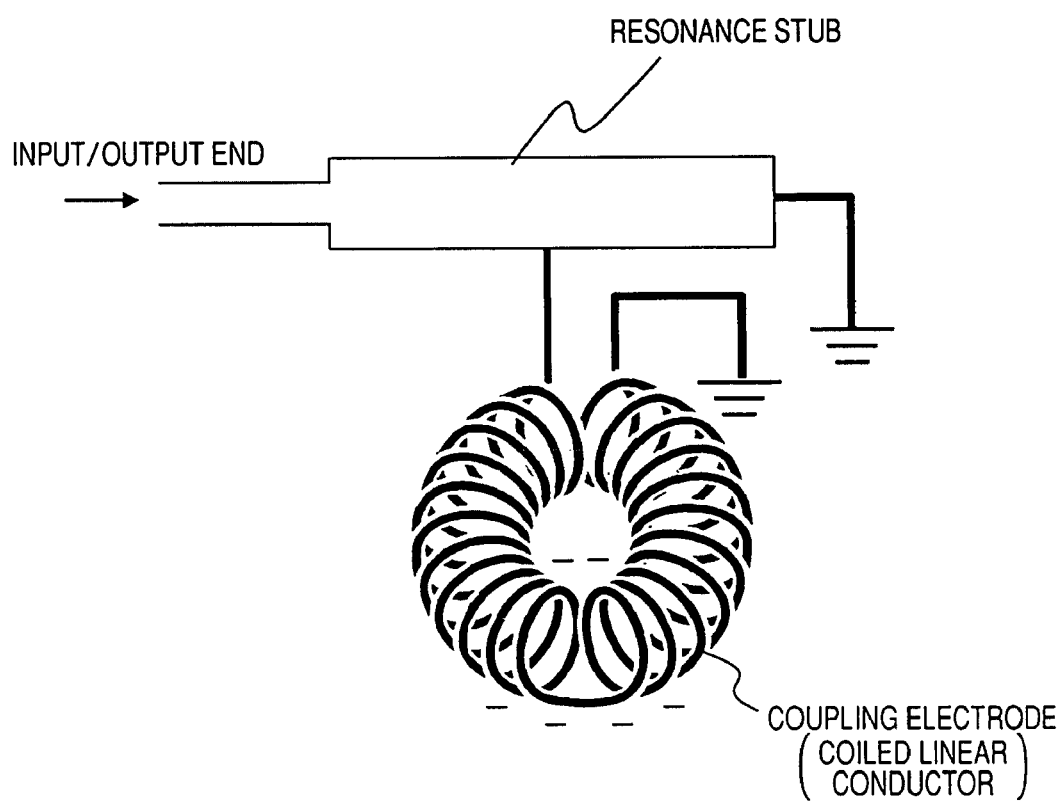
FIG. 9 shows another example of a configuration of a high-frequency electric field coupler having a resonance unit that is a half-wavelength short stub.

FIG. 9 shows another example of a configuration of a high-frequency electric field coupler having a resonance unit which is a half-wavelength short stub. A coupling electrode in the form of a coil is connected to a position of the short stub substantially at the center of the same, and an end of the electrode is shorted to ground. The reason for connecting the coupling electrode to the substantially central position of the short stub is that a standing wave in the short stub with a length equivalent to a half-wavelength has a maximum amplitude in the vicinity of the center. The example is different from the example shown in FIG. 6 primarily in that the coupling electrode, which is a coiled linear conductor, is bent in the form of a ring. The coupling electrode can be accommodated in a smaller space because it is ring-shaped, and a further reduction in the size of the high-frequency electric field coupler can be achieved. While a straight coil generates an electric field which is uniformly oriented in the radial direction of the coil, the ring-shaped coil provides stable coupling strength which is less orientation-dependent. It is considered that such an effect is further improved by bending the coil serving as the coupling electrode in a helical shape (not shown) instead of a ring-like shape.

In the example shown in FIG. 9, in the coupling electrode that is a coiled conductor bent in the form of a ring, the winding direction of the coil is reversed in the middle of the ring. The result is equivalent to forming a coupling electrode in the form of a coil by combining a plurality of coils wound in opposite directions. By reversing the coil winding direction as thus described, a magnetic current generated in the coupling electrode can be cancelled to reduce radiation of unnecessary electric waves.

Obviously, the reversal of a coil winding direction in the middle of a ring may be carried out also in the high-frequency electric field coupler having a resonance unit that is an open stub, shown in FIG. 8.

Figure 10:
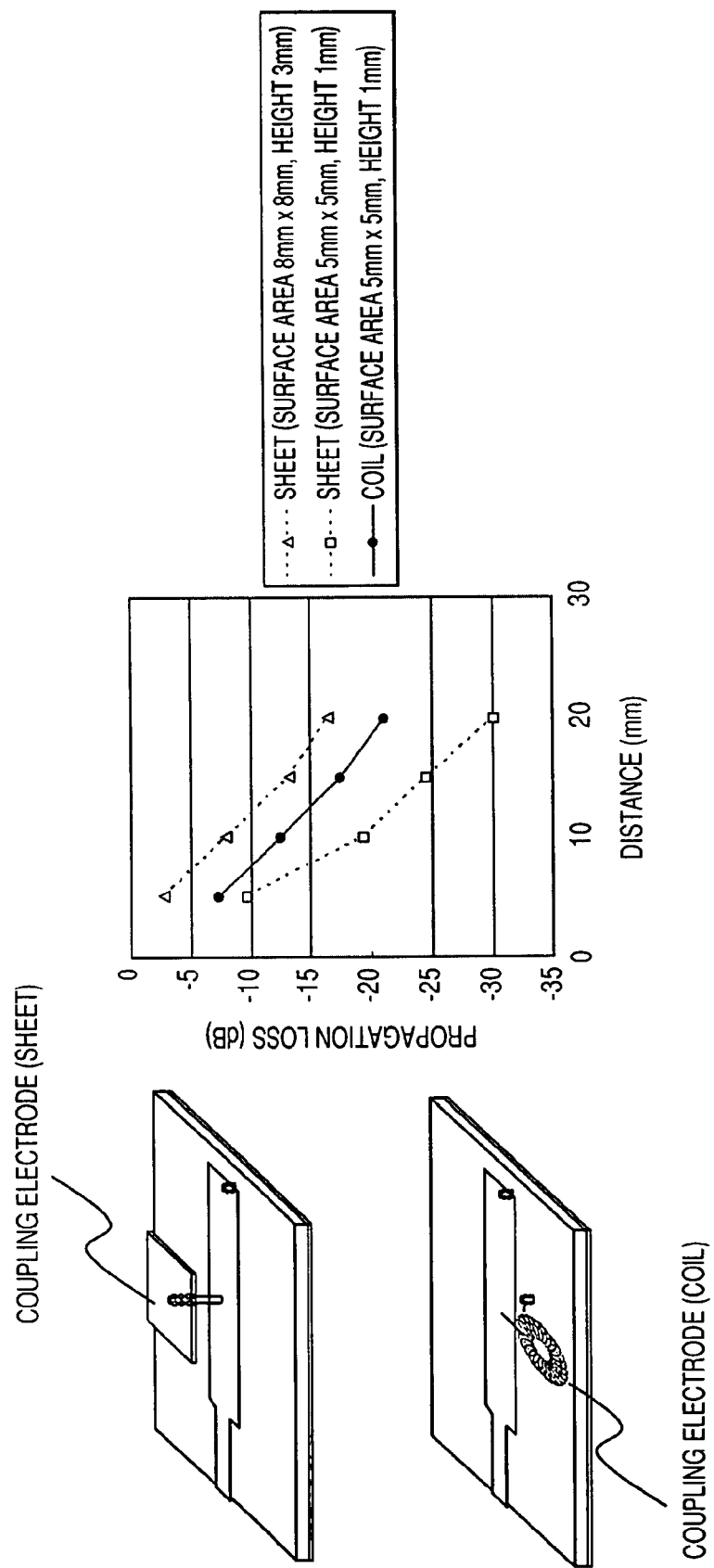
FIG. 10 is a graph showing results of a comparison between propagation losses of a high-frequency electric field coupler having a coupling electrode that is a coiled linear conductor and propagation losses of a high-frequency electric field coupler having a sheet-like coupling electrode.

FIG. 10 shows results of a comparison between propagation losses of a high-frequency electric field coupler having a coupling electrode constituted by a coiled linear conductor and propagation losses of a high-frequency electric field coupler having a sheet-like coupling electrode. The high-frequency electric field coupler having a coupling electrode in the form of a metal sheet suffers from greater reductions in efficiency and greater losses when the surface area and height of the electrode are small. On the contrary, the high-frequency electric field coupler having a coupling electrode in the form of a coil has smaller losses compared to the sheet-like high-frequency electric field coupler even though it has a smaller electrode. This is considered attributable to the fact that an electric field is more easily formed outside the linear electrode which is more weakly coupled to ground than the sheet-like electrode.

It should be understood by those skilled in the art that various modifications, combinations, sub-combinations and alterations may occur depending on design requirements and other factors insofar as they are within the scope of the appended claims or the equivalents thereof.

In present specification, the description has focused on an embodiment of a coupler applied to a communication system for cableless data transmission utilizing electric field coupling of UWB signals. However, the gist of the invention is not limited to such an embodiment. For example, the invention may be similarly applied to communication systems utilizing high-frequency signals other than UWB communication systems and communication systems transmitting data using signals having relatively low frequencies on an electric field coupling basis.

The invention has been disclosed in the form of presentation of examples, and the contents of this specification should not be taken in a limiting sense. The gist of the invention should be understood with reference to the appended claims.

What is claimed is:

1. A high-frequency electric field coupler used in a contactless communication system propagating high frequency signals in a wide band utilizing electric field coupling, comprising:
    a coupling electrode; and
    a resonance unit operating to increase the amplitude of electrical charge accumulated at the coupling electrode at a predetermined resonance frequency,
    wherein:
        the coupling electrode is formed by a coiled linear conductor;
        the resonance unit is a short stub having a length equivalent to one half of the used wavelength and having a terminating end shorted to ground; and
        the coupling electrode formed by a coiled linear conductor is connected to a position of the short stub substantially at the center thereof and shorted to ground at an end thereof.

2. A communication apparatus comprising:
    a communication circuit unit processing a high-frequency signal for data transmission; and
    a high-frequency electric field coupler performing electric field coupling with a party to communicate provided opposite to the same at an ultra short distance,
    wherein:
        the high-frequency electric field coupler includes
            a coupling electrode formed by a coiled linear conductor and a resonance unit operating to increase the amplitude of electrical charge accumulated at the coupling electrode at a predetermined resonance frequency; and
            the length of the coupling electrode formed by a coiled linear conductor is determined such that there is a phase difference of about 180 degrees between input and output signals which are a high-frequency signal input from one end of the linear conductor and a resultant signal output from another end of the same, respectively.

3. A high-frequency electric field coupler used in a contactless communication system propagating high frequency signals in a wide band utilizing electric field coupling, comprising:
    a coupling electrode; and
    a resonance unit operating to increase the amplitude of electrical charge accumulated at the coupling electrode at a predetermined resonance frequency,
    wherein:
        the coupling electrode is formed by a coiled linear conductor; and
        the length of the coupling electrode formed by a coiled linear conductor is determined such that there is a phase difference of about 180 degrees between input and output signals which are a high-frequency signal input from one end of the linear conductor and a resultant signal output from another end of the same, respectively.

4. A high-frequency electric field coupler used in a contactless communication system propagating high frequency signals in a wide band utilizing electric field coupling, comprising:
    a coupling electrode; and
    a resonance unit operating to increase the amplitude of electrical charge accumulated at the coupling electrode at a predetermined resonance frequency,
    wherein:
        the coupling electrode is formed by a coiled linear conductor; and
        the surface of the linear conductor is coated with an insulation layer.

5. A high-frequency electric field coupler used in a contactless communication system propagating high frequency signals in a wide band utilizing electric field coupling, comprising:
- a coupling electrode; and
- a resonance unit operating to increase the amplitude of electrical charge accumulated at the coupling electrode at a predetermined resonance frequency, wherein:
- the coupling electrode is formed by a coiled linear conductor; and
- the linear conductor is wound around a core bar.

6. A high-frequency electric field coupler used in a contactless communication system propagating high frequency signals in a wide band utilizing electric field coupling, comprising:
- a coupling electrode; and
- a resonance unit operating to increase the amplitude of electrical charge accumulated at the coupling electrode at a predetermined resonance frequency, wherein:
- the coupling electrode is formed by a coiled linear conductor; and
- the linear conductor is fixed with a resin after being wound in the form of a coil.

7. A communication apparatus comprising:
- a communication circuit unit processing a high-frequency signal for data transmission; and
- a high-frequency electric field coupler performing electric field coupling with a party to communicate provided opposite to the same at an ultra short distance, wherein:
- the high-frequency electric field coupler includes
  - a coupling electrode formed by a coiled linear conductor and a resonance unit operating to increase the amplitude of electrical charge accumulated at the coupling electrode at a predetermined resonance frequency; and
  - the surface of the linear conductor is coated with an insulation layer.

8. A communication apparatus comprising:
- a communication circuit unit processing a high-frequency signal for data transmission; and
- a high-frequency electric field coupler performing electric field coupling with a party to communicate provided opposite to the same at an ultra short distance, wherein:
- the high-frequency electric field coupler includes
  - a coupling electrode formed by a coiled linear conductor and a resonance unit operating to increase the amplitude of electrical charge accumulated at the coupling electrode at a predetermined resonance frequency; and
- the linear conductor is wound around a core bar.

9. A communication apparatus comprising:
- a communication circuit unit processing a high-frequency signal for data transmission; and
- a high-frequency electric field coupler performing electric field coupling with a party to communicate provided opposite to the same at an ultra short distance, wherein:
- the high-frequency electric field coupler includes
  - a coupling electrode formed by a coiled linear conductor and a resonance unit operating to increase the amplitude of electrical charge accumulated at the coupling electrode at a predetermined resonance frequency; and
- the linear conductor is fixed with a resin after being wound in the form of a coil.

10. A communication apparatus comprising:
- a communication circuit unit processing a high-frequency signal for data transmission; and
- a high-frequency electric field coupler performing electric field coupling with a party to communicate provided opposite to the same at an ultra short distance, wherein:
- the high-frequency electric field coupler includes
  - a coupling electrode formed by a coiled linear conductor and a resonance unit operating to increase the amplitude of electrical charge accumulated at the coupling electrode at a predetermined resonance frequency;
- the resonance unit is a short stub having a length equivalent to one half of the used wavelength and having a terminating end shorted to ground; and
- the coupling electrode formed by a coiled linear conductor is connected to a position of the short stub substantially at the center thereof and shorted to ground at an end thereof.

* * * * *